(12) United States Patent
Von Hippel et al.

(10) Patent No.: US 11,574,576 B1
(45) Date of Patent: Feb. 7, 2023

(54) DYNAMIC REFRESH RATE SWITCHING

(71) Applicant: Microsoft Technology Licensing, LLC, Redmond, WA (US)

(72) Inventors: Michael Paul Erich Von Hippel, Seattle, WA (US); Ana Marta Amaral De Carvalho, Bellevue, WA (US); Hrushit Kamal Parikh, Bellevue, WA (US); Reiner Fink, Mercer Island, WA (US); Steve Michel Pronovost, Redmond, WA (US); Zhigang Xu, Bellevue, WA (US); Zachary Scott Northrup, Redmond, WA (US); Leonardo E. Blanco, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/738,876

(22) Filed: May 6, 2022

(51) Int. Cl.
    *G09G 3/20*     (2006.01)

(52) U.S. Cl.
    CPC ....... *G09G 3/20* (2013.01); *G09G 2340/0435* (2013.01); *G09G 2354/00* (2013.01)

(58) Field of Classification Search
    CPC ............. G09G 3/20; G09G 2340/0435; G09G 2354/00
    See application file for complete search history.

(56) References Cited

U.S. PATENT DOCUMENTS

| | | |
|---|---|---|
| 9,099,047 B2 | 8/2015 | Vasquez et al. |
| 9,240,031 B1 | 1/2016 | Wang |
| 9,318,069 B2 | 4/2016 | Nambi et al. |
| 2008/0055318 A1 | 3/2008 | Glen |
| 2008/0143729 A1 | 6/2008 | Wyatt et al. |
| 2012/0147020 A1 | 6/2012 | Hussain et al. |
| 2020/0026406 A1* | 1/2020 | Choi ................... G06F 3/04184 |

(Continued)

FOREIGN PATENT DOCUMENTS

CN      111768738 A      10/2020

OTHER PUBLICATIONS

"AMD FreeSync™ Technology", Retrieved from: https://web.archive.org/web/20210914172245/https:/www.amd.com/en/technologies/free-sync, Sep. 14, 2021, 5 Pages.

(Continued)

*Primary Examiner* — Sejoon Ahn

(57) ABSTRACT

Dynamic refresh rate (DRR) switching is used to dynamically update a refresh rate of content presented on an interface. When a first application and a second application are presented on a user interface at a first refresh rate; a request may be received to temporarily boost the first refresh rate to a second, higher, refresh rate. DRR switching is initiated as the first refresh rate is temporarily boosted to a second refresh rate. Applications that are opted in to the second refresh rate receive signals to refresh content at the second refresh rate, while applications that are not opted in to the second refresh rate receive signals to refresh content at a virtualized refresh rate that matches the first refresh rate. Thus, the first application refreshes content at the first refresh rate and the second application refreshes content at the second, higher refresh rate, providing a smooth user experience without unnecessarily utilizing power consumption.

20 Claims, 8 Drawing Sheets

(56) References Cited

U.S. PATENT DOCUMENTS

| | | | |
|---|---|---|---|
| 2020/0027419 A1* | 1/2020 | Oh | G09G 3/3696 |
| 2020/0027422 A1* | 1/2020 | Kuo | G09G 5/38 |

OTHER PUBLICATIONS

"DCompositionWaitForCompositorClock function (dcomp.h)", Retrieved from: https://docs.microsoft.com/en-us/windows/win32/api/dcomp/nf-dcomp-dcompositionwaitforcompositorclock, Oct. 21, 2021, 2 Pages.

"Direct Manipulation", Retrieved from: https://docs.microsoft.com/en-us/windows/win32/api/_directmanipulation/, May 25, 2021, 11 Pages.

"Frame Pacing Library", Retrieved from: https://web.archive.org/web/20211025015309/https:/developer.android.com/games/sdk/frame-pacing, Oct. 25, 2021, 7 Pages.

"G-Sync", Retrieved from: https://web.archive.org/web/20211115010228/https:/www.nvidia.com/en-us/geforce/products/g-sync-monitors/, Nov. 15, 2021, 6 Pages.

"IDCompositionDevice::GetFrameStatistics method (dcomp.h)", Retrieved from: https://docs.microsoft.com/en-us/windows/win32/api/dcomp/nf-dcomp-idcompositiondevice-getframestatistics, Oct. 13, 2021, 2 Pages.

"IDXGIOutput::WaitForVBlank method (dxgi.h)", Retrieved from: https://docs.microsoft.com/en-us/windows/win32/api/dxgi/nf-dxgi-idxgioutput-waitforvblank, Jun. 29, 2021, 2 Pages.

"IDXGISwapChain::SetFullscreenState method", Retrieved from: https://docs.microsoft.com/en-us/windows/win32/api/dxgi/nf-dxgi-idxgiswapchain-setfullscreenstate, Apr. 2, 2021, 4 Pages.

"IDXGISwapChainMedia interface (dxgi1_3.h)", Retrieved from: https://docs.microsoft.com/en-us/windows/win32/api/dxgi1_3/nn-dxgi1_3-idxgiswapchainmedia, Jul. 23, 2021, 3 Pages.

"Optimizing ProMotion Refresh Rates for iPhone 13 Pro and iPad Pro", Retrieved from: https://web.archive.org/web/20210925051521/https:/developer.apple.com/documentation/quartzcore/optimizing_promotion_refresh_rates_for_iphone_13_pro_and_ipad_pro, Sep. 25, 2021, 5 Pages.

"present(_:atTime:)", Retrieved from: https://web.archive.org/web/20190617221225/https:/developer.apple.com/documentation/metal/mtlcommandbuffer/1442989-present, Jun. 17, 2019, 2 Pages.

"present(afterMinimumDuration:)", Retrieved from: https://developer.apple.com/documentation/metal/mtldrawable/2806859-present, Retrieved Date: Mar. 24, 2022, 2 Pages.

"Send Feedback to Microsoft with the Feedback Hub App", Retrieved from: https://web.archive.org/web/20201020202724/https:/support.microsoft.com/en-us/windows/send-feedback-to-microsoft-with-the-feedback-hub-app-f59187f8-8739-22d6-ba93-f66612949332, Oct. 20, 2020, 5 Pages.

"Variable Refresh Rate", Retrieved from: https://web.archive.org/web/20201011231713/https:/en.m.wikipedia.org/wiki/Variable_refresh_rate, Oct. 11, 2020, 2 Pages.

"Windows Insider", Retrieved from: https://web.archive.org/web/20211112133930/https:/insider.windows.com/en-us/, Nov. 12, 2021, 5 Pages.

Abraham, Ady, "High Refresh Rate Rendering on Android", Retrieved from: https://android-developers.googleblog.com/2020/04/high-refresh-rate-rendering-on-android.html, Apr. 27, 2020, 6 pages.

"iPad Pro, in 10.5-inch and 12.9-inch Models, Introduces the World's Most Advanced Display and Breakthrough Performance", Retrieved from: https://www.apple.com/pt/newsroom/2017/06/ipad-pro-10-5-and-12-9-inch-models-introduces-worlds-most-advanced-display-breakthrough-performance/, Jun. 5, 2017, 8 Pages.

Knight, Austin, "Why Do Designers Prefer Macs?", Retrieved from: https://web.archive.org/web/20201202145515/https:/austinknight.com/writing/designers-prefer-macs, Dec. 2, 2020, 9 Pages.

Marta C, Ana, "Dynamic Refresh Rate—Get the Best of Both Worlds", Retrieved from: https://devblogs.microsoft.com/directx/dynamic-refresh-rate/, Jun. 28, 2021, 6 Pages.

Villas-Boas, Antonio, "10 Reasons to Get an Apple Mac Instead of a Windows PC", Retrieved from: https://www.businessinsider.in/tech/10-reasons-to-get-an-apple-mac-instead-of-a-windows-pc/articleshow/64357168.cms, May 28, 2018, 19 Pages.

White, et al., "Variable Refresh Rate Displays", Retrieved from: https://docs.microsoft.com/en-us/windows/win32/direct3ddxgi/variable-refresh-rate-displays, Jan. 7, 2021, 4 Pages.

Zibreg, Christian, "Tip: Save Power by Restricting iPad Pro's ProMotion Display Refresh Rate to 60FPS", Retrieved from: https://www.idownloadblog.com/2017/11/20/how-to-ipad-pro-display-60fps/, Nov. 20, 2017, 7 Pages.

Kennedy, et al., "Compositor Clock", Retrieved from: https://docs.microsoft.com/en-us/windows/win32/directcomp/compositor-clock/compositor-clock, Oct. 5, 2021, 12 Pages.

* cited by examiner

DYNAMIC REFRESH RATE SWITCHING

BACKGROUND

Some modern electronic computing devices include display devices, such as a display screen, that are capable of executing at high-frequency refresh rates and dynamically switching between higher and lower refresh rates depending on the application presently presented on the screen. For example, some display screens are capable of executing at or above rates of 120 Hz. While increased refresh rates improve the user experience on such devices, additional power is consumed when compared to executing at lower refresh rates, such as 60 Hz.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to systems and methods that dynamically update a refresh rate of content presented by one or more applications on at least one user interface. For example, the system comprises at least one processor, a first application and a second application, at least one user interface configured to present the first application and the second application executing at a first refresh rate, and at least one memory storing instructions. When executed by the processor, the instructions cause the processor to, responsive to receiving a request from the second application to temporarily boost the first refresh rate, determine to temporarily boost the first refresh rate to a second refresh rate, wherein the second refresh rate is higher than the first refresh rate, control a scheduler, implemented on the at least one processor, to identify the second application as opted in to the second refresh rate and identify the first application as not opted in to the second refresh rate, control the scheduler to transmit a first signal to the first application to refresh first content presented on the user interface at the first refresh rate, wherein the first signal is transmitted in accordance with a virtualized refresh rate, control the scheduler to transmit a second signal to the second application to refresh second content presented on the user interface at the second refresh rate, wherein the second signal is transmitted in accordance with a non-virtualized refresh rate, and control the first application to refresh the first content at the first refresh rate upon receipt of the first signal and the second application to refresh the second content at the second refresh rate upon receipt of the second signal.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Figure 1:
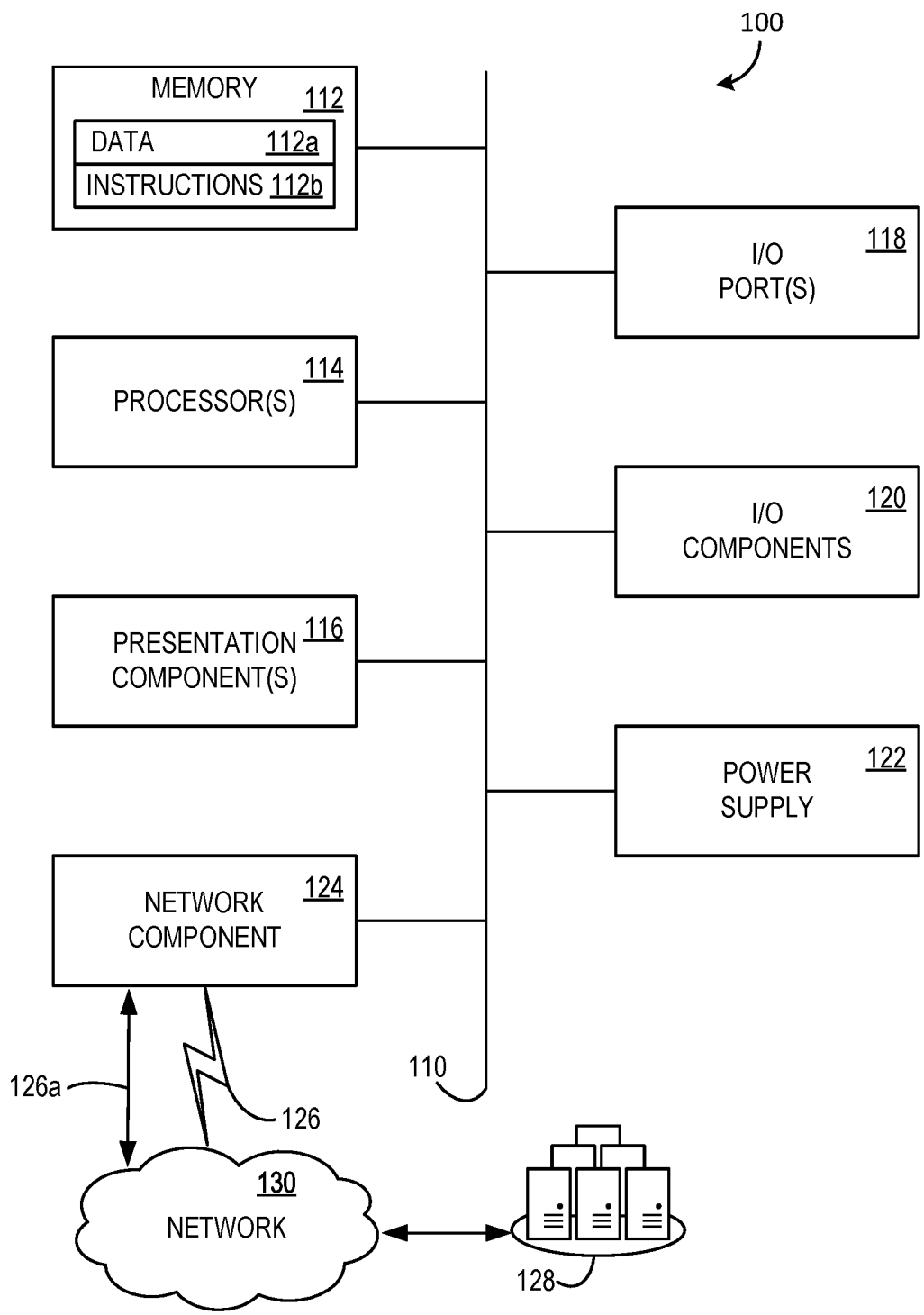
FIG. 1 is a block diagram illustrating an example computing device for implementing various examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As described herein, the displays of modern devices and monitors are capable of refreshing at higher frequency rates, up to 120 Hz or higher, and dynamically updating the refresh rates by switching between higher and lower refresh rates depending on the application presently presented on the screen. Higher refresh rates provide smoother transitions, which improves the user experience. However, some applications may be incompatible with higher refresh rates, or, due to the nature of the application, the user experience is minimally, or not at all, improved by executing on the higher refresh rate. In these scenarios, negligible benefit is provided in comparison to the cost of additional power being consumed to refresh at the higher refresh rate.

For some devices, such as those with relatively smaller screens that typically display only a single application at a time, this presents little challenge. In this case, the screen presents the displayed application in the best refresh rate for the particular application. However, in some instances, larger screens may present multiple applications at a single time. This presents additional challenges because some applications are most advantageously presented at a higher refresh rate than others.

Current solutions address these challenges by changing the duration of frames and frequency of all applications at the operating system level. For example, gaming applications synchronize frame rates with the refresh rate of the monitor. However, these solutions fail to transition between two constant refresh rates. While these solutions change between refresh rates, the refresh rates are not constant between multiple frames. Other solutions utilize an application programming interface (API) to select a specific refresh rate for the lifecycle of the application or by the operating system itself. For example, a first application may request to execute at a high refresh rate for the duration that the application is open. Where another application is executing at one refresh rate, the operating system also changes the refresh rate for the content of the second application, which affects the user experience on the second application. Another solution controls refresh rates of the screen only when the system is idle, which fails to improve the user experience or balance the user experience with power consumption.

The present application addresses these deficiencies by providing a dynamic refresh rate (DRR) process that dynamically changes, or switches, the refresh rate of content presented on a user interface seamlessly and dynamically between multiple refresh rates based on the type of content shown and the applications requesting a particular refresh rate. This dynamic switching supports multiple applications on a single interface at one time that request different refresh rates. Accordingly, the present application enables dynamic switching by temporarily boosting the refresh rate of all active applications, i.e., applications actively producing new frames, on the display to the higher refresh rate while maintaining virtual refresh rates for applications that are unable to refresh at the higher refresh rate or have opted not to execute at a lower refresh rate. This enables applications to control when additional speeds are observed and to request a higher refresh rate, such as for a specific animation or animations.

As referenced herein, the refresh rate of a respective application is controlled by the frequency at which a vertical blanking interval (vblank) is received. A vblank is pulse, or signal, sent to each executing application at a specified frequency to indicate a new frame. Timing information for the vblank(s) sent to an application is controlled by a clock, such as a presentation clock or a compositor clock. Each application uses the clock to map when to wake to receive a next vblank indicating to refresh the content the application presents.

Various examples of the present disclosure provide vblanks that may be sent on a virtualized frequency or a non-virtualized frequency. As referenced herein, non-virtualized refers to an actual, or real, frequency at which content presented on a user interface is refreshed and virtualized refers to an alternative frequency, different from the non-virtualized frequency, at which content presented on a user interface may be refreshed. For example, applications capable of refreshing content at an increased rate may receive vblanks to refresh at a non-virtualized frequency, while applications not capable of refreshing content at the increased rate may receive vblanks to refresh at the virtualized frequency to avoid receiving vblanks to refresh content at a higher rate than the application is capable of.

Various examples of the present disclosure recognize and take into account the advantages of switching between a higher refresh rate and a lower refresh rate in real-time. For example, a baseline refresh rate may be a refresh rate at an initial frequency at which all executing applications are capable of executing. When refreshing at the baseline refresh rate, the system or application may request a boost to temporarily run, or execute, at the higher refresh rate. When the temporary boost is implemented, applications that are capable of, and opted in to, the higher, non-virtualized frequency temporarily receive vblanks at the non-virtualized frequency while applications that are not capable of refreshing at the higher, non-virtualized frequency and/or have not opted in to the higher, non-virtualized frequency receive vblanks at the virtualized frequency, which mirrors the initial frequency for the baseline refresh rate. By providing only the temporary boost, the power efficiency of the system as a whole is improved while simultaneously providing smooth refresh rate experiences to the user when doing so is advantageous. This limits erratic application behavior during refresh rate changes so that vblanks will obfuscate changes by default, allowing some applications to opt in to be notified of the refresh rate when the refresh rate changes. In other words, the applications may receive clock notifications and produce frames at a baseline, lower refresh rate and then receive clock notifications and produce frames at the higher refresh rate as the refresh rate dynamically switches to the higher refresh rate.

As referenced herein, a refresh rate of a display, such as a monitor, is the number of times per second that the content is refreshed on the display. For example, a display refreshing at 60 Hz will be updated sixty times per second, a display refreshing at 120 Hz will be updated at 120 times per second, and so forth. The refresh rate determines how smoothly motion appears on the display. For example, where the content on the display is a gaming application that includes fast-moving action, a higher refresh rate may improve the overall gaming experience of the user by better keeping up with the action. A higher refresh rate may also improve the user experience by implementing smoother motion when browsing the web or using a digital pen to write or draw on the display.

As referenced herein, the terms lower refresh rate and higher refresh rate should be understood to be relative terms. For example, a lower refresh rate may refer to a refresh rate of 60 Hz and a higher refresh rate may refer to a refresh rate of 120 Hz. 60 Hz is a lower refresh rate than 120 Hz, and 120 Hz is a higher refresh rate than 60 Hz. However, the specific refresh rates of 60 Hz and 120 Hz are provided as examples only and should not be construed as limiting. The lower refresh rate may be higher or lower than 60 Hz and the higher refresh rate may be higher or lower than 120 Hz without departing from the scope of the present disclosure.

In order to temporarily boost the refresh rate of all active applications while maintaining the virtual refresh rates for applications executing at a lower speed, the present disclosure implements virtualized rates and non-virtualized rates for different applications. As referenced herein, a virtualized rate is the refresh rate that is provided to applications executing at a lower speed, whereas a non-virtualized rate is the refresh rate of all active applications, exclusive of applications executing at the virtualized refresh rate. The virtualized rate is provided to applications executing at the lower speed in order to enable refreshing of the content at a rate compatible with the application's capabilities and proper behavior of the user interface throughout the period of temporary boosting, so that these applications do not receive instructions to execute at speeds greater than their capabilities.

As referenced herein, boosting the refresh rate refers to increasing the refresh rate of frames presented on a display, monitor, or interface from an original, unboosted refresh rate. The boosted refresh rate is an integer multiple of the original, unboosted refresh rate. For example, where the original refresh rate is 60 Hz, a boosted refresh may be 120 Hz, 180 Hz, and so forth. Boosting the refresh rate to an increased refresh rate includes increasing a frequency at which vblanks are delivered to an application, or applications, to refresh content presented on the display by the application. A temporary boost of the refresh rate is referred to herein as dynamically switching the refresh rate.

As referenced herein, the virtualized rates and non-virtualized rates are implemented by sending either a virtualized vblank or a non-virtualized vblank to each application at the different refresh rates. As referenced herein, a vblank is a signal provided separately to each application indicating a new frame. A virtualized vblank is provided at the same time and at the same rate for each application executing at the virtualized rate and a non-virtualized vblank is provided at the same time and at the same rate for each application executing at the non-virtualized rate.

Accordingly, the present application enables the device's power savings rate to remain competitive with the dynamically changing high refresh rates while enabling a user to control boosting availability as needed. Adoption of automatically boosted API sets and a predictable boosting experience and capabilities across panels is improved. The present disclosure may be further implemented while the system is executed using a single monitor or more than one monitor.

FIG. 1 is a block diagram illustrating an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should the computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Program components include routines, programs, objects, components, data structures, and the like that refer to code, performs particular tasks, or implement particular abstract data types. The disclosed examples may be practiced in a variety of system configurations, including servers, personal computers, laptops, smart phones, servers, virtual machines (VMs), mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112*a* and instructions 112*b* that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, Calif., open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor 114, by multiple processors 114 within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Example presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126*a* across network 130 to a cloud environment 128. Various different examples of communication links 126 and 126*a* include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 may be implemented as one or more servers. The computing device 100 may be implemented as a system 200 or in the system 200 as described in greater detail below.

Figure 2:
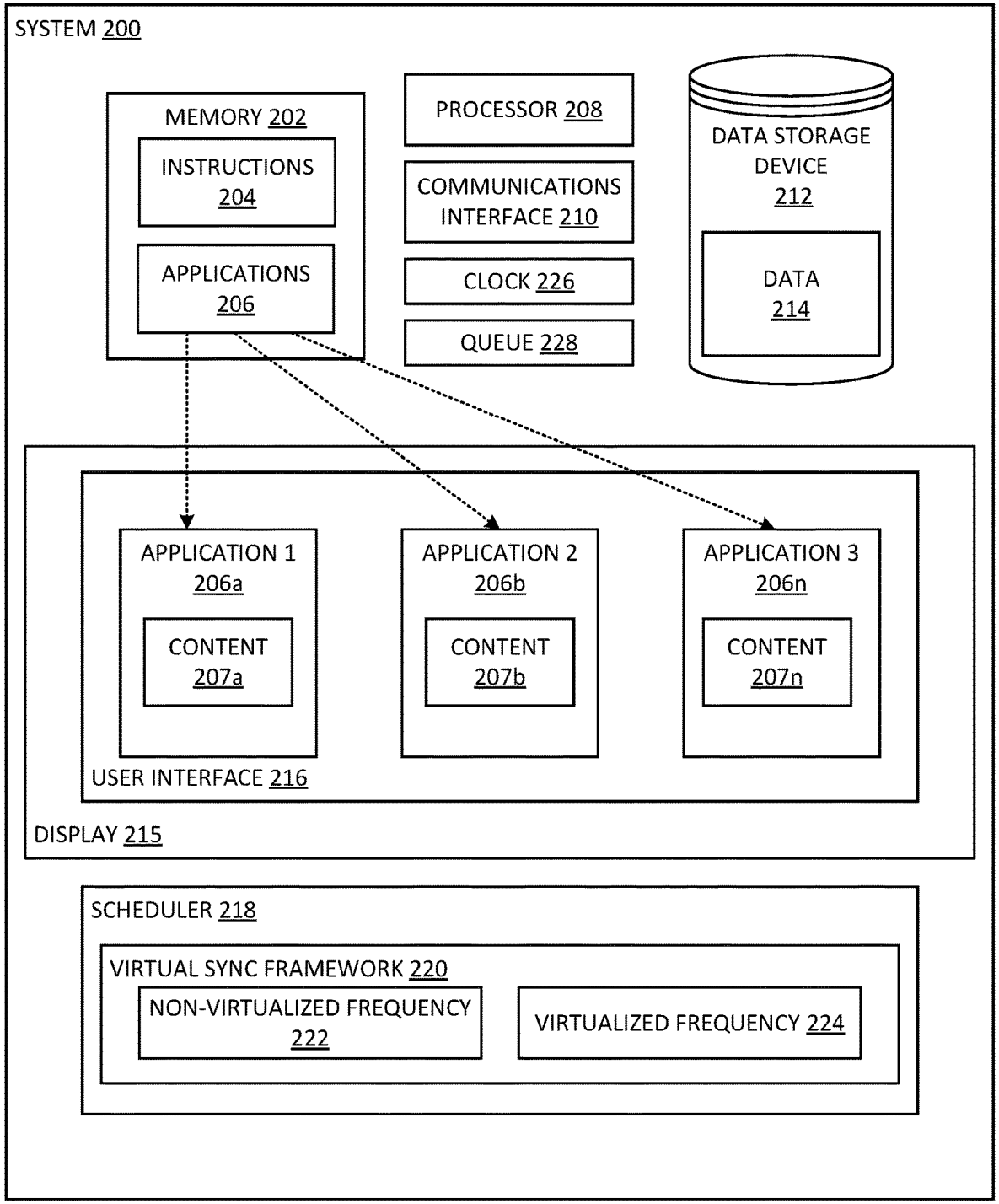
FIG. 2 is a block diagram illustrating an example computing device for implementing various examples of the present disclosure.

FIG. 2 is a block diagram illustrating an example computing device for implementing various examples of the present disclosure. The system 200 may include the computing device 100. In some implementations, the system 200 includes a cloud-implemented server that includes each of the components of the system 200 described herein. In some implementations, the system 200 is presented as a single computing device that contains each of the components of the system 200. For example, the system 200 may include a laptop computer containing each of the components described herein. In other implementations, the system 200 includes multiple devices. For example, the system 200 may include a computer connected to one or more monitors utilized as the user interface 216.

The system 200 includes a memory 202, a processor 208, a communications interface 210, a data storage device 212, a user interface 216, and a scheduler 218. The memory 202 stores instructions 204 executed by the processor 208 to control the communications interface 210, the user interface 216, and the scheduler 218. The memory 202 further stores data, such as one or more applications 206. An application 206 is a program designed to carry out a specific task on the system 200. For example, the applications 206 may include, but are not limited to, drawing applications, paint applications, web browser applications, messaging applications, navigation/mapping applications, word processing applications, game applications, an application store, applications included in a suite of productivity applications such as calendar applications, instant messaging applications, document storage applications, video and/or audio call applications, and so forth, and specialized applications for a particular system 200. The applications 206 may communicate with counterpart applications or services, such as web services. In an example, the applications 206 represent downloaded client-side applications that correspond to server-side services executing in a cloud.

The processor 208 executes the instructions 204 stored on the memory 202 to execute various functions of the system 200. For example, the processor 208 controls the communications interface 210 to transmit and receive various signals and data, controls the data storage device 212 to store data 214, controls the user interface 216 to display one or more client-side versions of the applications 206, and controls the scheduler 218 to control the dynamic refresh rate switching, i.e., temporary boosting, of the applications 206 displayed on the user interface 216.

In some implementations, the processor 208 receives and logs requests from one or more of the applications 206 and/or the operating system of the system 200. For example, instructions for the operating system may be included within the instructions 204. The instructions 204 may, in some examples, manage the refresh rate, including sending requests to boost or unboost the refresh, on behalf of the one or more applications 206. In another example, an application 206 may request to temporarily boost the refresh rate of the user interface 216 from an original refresh rate to an increased refresh rate, request to unboost the refresh rate of the user interface 216, inquire to the processor 208 whether the application 206 has an active boosting request, and so forth. As described herein, boosting the refresh rate from the original refresh rate to the boosted refresh rate includes increasing a frequency at which vblanks are delivered to an application, or applications, to refresh content presented on the user interface 216 by the application 206.

The data storage device 212 stores data 214. The data 214 may include any data, including data related to dynamic refresh rate switching for the applications 206 presented on the user interface 216 and/or other data stored on the system 200. For example, the data 214 may include version history of each particular application 206. The scheduler 218 may use the data 214 to determine which of the applications 206 may be presented on the user interface 216 at a boosted refresh rate and which of the applications 206 are to be presented on the user interface 216 at an original, baseline refresh rate.

The user interface 216 presents one or more applications 206. The user interface 216 may be presented on a display 215. For example, the user interface 216 may be presented on a display 215, such as or a monitor, that presents one or more applications 206 at a time. The display 215 may be an in plane switching (IPS) liquid-crystal display (LCD), an LCD without IPS, an organic light-emitting diode (OLED) screen, or any other suitable type of display. In some implementations, the display 215 includes a touch screen such that the user interface 216 may directly receive an input, such as from a stylus or from the finger of a user of the system 200. The display 215 supports various interactions, such as panning, scrolling, zooming in, zooming out, inking, and so forth. As referenced herein, inking refers to the process of interacting with an application 206 by contacting the display 215, such as with a stylus or the finger of a user. For example, the application 206 may be a paint or drawing application where the user draws on the user interface 216. The markings made on the display 215 appear on the user interface 216 as content presented by the application 206.

Figure 6:
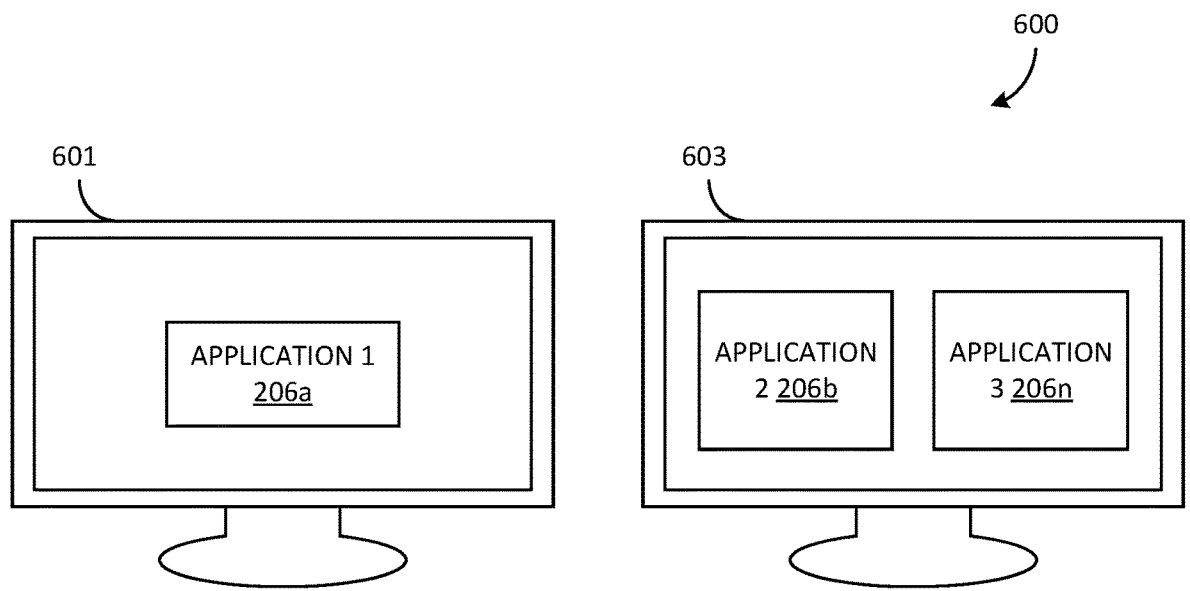
FIG. 6 illustrates an example system including applications displayed on more than one display according to various examples of the present disclosure.

In some implementations, the display 215 includes a single display, such as a single monitor. In other implementations, the display 215 includes multiple displays, such as more than one monitor. Where the display 215 includes multiple displays, the displays may be extended such that content may be displayed on both displays, duplicated such that the same content is displayed on each display, or content may be displayed on only one of the displays. Although the display 215 presenting the user interface 216 is shown in FIG. 2 as implemented on the system 200, various examples are possible. For example, the display 215 may include one or more monitors connected to the system 200 via wired or wireless methods, as illustrated in FIG. 6 and described in greater detail below. Examples of wired methods include a high-definition multimedia interface (HDMI) cable, a universal serial bus (USB) cable such as a USB-C cable, a digital visual interface (DVI) cable, or any other suitable cable for connecting a monitor to the system 200. Examples of wireless methods include Bluetooth™ connection, a wireless internet connection such as Wi-Fi™, or any other suitable method.

Each application 206 displays content 207 corresponding to the application 206 on the user interface 216 presented on the display 215. For example, the first application 206a displays content 207a, the second application 206b displays content 207b, and the third application 206n displays content 207n.

As shown in FIG. 2, the user interface 216 displays the first application 1 206a, the second application 2 206b, and the third application 3 206n. The user interface 216 may display any number of applications 206 without departing from the scope of the present disclosure. For example, the user interface 216 may display one application 206, two applications 206, or more than two applications 206 at a time. Multiple applications 206 may be displayed in various configurations. For example, the application 1 206a may be displayed side by side with the application 2 206b such that no overlapping is present between the application 1 206a and the application 2 206b and each application is fully visible on the user interface 216. As another example, the application 1 206a may be displayed with the application 2 206b such that the application 1 206a overlaps the application 2 206b, or such that the application 2 206b overlaps the applications 1 206a. In some implementations, one or more of the applications 206 may be visible in the foreground of the user interface 216 while other applications 206 are executing in the background but not presented, or displayed, on the user interface 216.

In some examples, the user interface 216 is configured with manufacturer settings that support or do not support the temporary boosting of the refresh rate for the particular user interface 216. Some examples of a user interface 216 support a maximum refresh rate that is lower than the boosted refresh rate for one or more of the applications 206. In these examples, the user interface 216 does not support the boosted refresh rate and no distinction is made between a boosted refresh rate and a virtualized refresh rate. However, it should be understood that although a particular monitor may be compatible with dynamically refreshing rates, the availability of temporarily boosting the refresh rate is dependent upon the system 200, particularly the operating system of the system 200 executed by the processor 208.

In implementations where more than one user interface 216 is implemented, such as when two monitors are concurrently presenting content of the system 200, the determination of whether boosting is available depends on which of the user interfaces 216 is characterized as the primary display, or target. The primary user interface 216 may be selected by a user or may be automatically selected by the processor 208. Various examples are possible when multiple monitors present content simultaneously. Where each monitor is compatible with boosting the refresh rate, boosting is performed as described herein. Where none of the implemented monitors are compatible with boosting, boosting of the refresh rate as described herein is unavailable. Where the primary monitor is compatible with boosting but other monitors are not compatible with boosting, boosting is performed as described herein and all applications 206 presented on monitors which are not compatible with boosting will refresh on the virtualized frequency 224, described in greater detail below. Where the primary monitor is not compatible with boosting but other monitors are compatible with boosting, boosting is not available for the applications 206 presented on any of the monitors. Thus, each monitor displays frames rendered at rates according to capabilities.

In other examples, the display 215 is configured to support varying refresh rates up to and including the boosted refresh rate. For example, the display 215 may support multiple refresh rates, such as a high refresh rate and a low refresh rate. In some implementations, the high refresh rate is 120 Hz or higher, though various implementations are possible. In some implementations, the low refresh rate is 60 Hz, though various implementations are possible. As referenced herein, the high refresh rate may be an integer multiple greater than the lower refresh rate. For example, where the lower refresh rate is 60 Hz, the higher refresh rate may be 120 Hz, or twice as high as the lower refresh rate. In another example, where the lower refresh rate is 60 Hz, the higher refresh rate may be 180 Hz, or three times as high as the lower refresh rate. It should be understood that the various examples of refresh rates described herein should not be construed as limiting. Various implementations are possible. More than two refresh rates may be used, the lower refresh rate may be higher or lower than 60 Hz, and the higher refresh rate may be higher or lower than 120 Hz without departing from the scope of the present disclosure.

The scheduler 218 may be a portion of the operating system of the system 200 and implemented when the instructions 204 are executed by the processor 208. The scheduler 218 includes a virtual synchronization (VSync) framework 220 layer that enables a constant pulse, or signal, to be sent to the applications 206a, 206b, 206n to refresh at specified rates. In some implementations, the pulse is referred to as a vblank. The vblank is a signal provided separately to each application indicating a new frame. In some examples, vblanks are initially provided at a baseline refresh rate. The baseline refresh rate is a refresh rate at an initial frequency at which all executing applications are capable of executing.

In some examples vblanks may be sent on either a non-virtualized frequency 222 or a virtualized frequency 224. The non-virtualized frequency 222 is the actual frequency at which the user interface 216 is refreshed. For example, where the baseline refresh rate is 60 Hz, during a temporary boost in refresh rate frequency, the boosted frequency may be 120 Hz. The non-virtualized frequency 222 is 120 Hz, because 120 Hz is the actual frequency at which the user interface 216 is refreshed. Applications 206 executing at the non-virtualized rate, including the application(s) 206 that requested the temporary boost, receive a vblank at the non-virtualized frequency 222. As described herein, the virtualized frequency 224 is a virtual frequency that enables applications 206, which have not opted in to run at a higher frequency, to continue operating at the baseline frequency. In this example, the virtualized frequency 224 matches the baseline frequency of 60 Hz. In this way, the virtualized frequency 224 operates to intentionally hold back some applications 206 from refreshing at a higher, i.e., non-virtualized frequency 222, rate, such as where the particular applications 206 are not capable of executing at the higher refresh rate or would see no benefit from executing at the higher refresh rate.

In some implementations, the system 200 includes a clock 226. The clock 226 may be a presentation, or compositor, clock that controls timing information for frames of the applications 206 presented on the user interface 216. For example, each application 206 may call the clock 226 to identify a time at which the application 206 should wake to receive a new vblank in order to refresh the content presented on the user interface 216. In some implementations, the clock 226 may include different clocks for the non-virtualized frequency 222 and the virtualized frequency 224. The clock 226 corresponding to the non-virtualized frequency 222 maps to vblanks expected according to the temporarily boosted refresh rate, while the clock 226 corresponding the virtualized frequency 224 maps to vblanks expected according to baseline refresh rate.

In some implementations, the clock 226 is provided to each of the applications 206 via an API called by each of the applications 206. The clock 226, such as the compositor clock API, provides statistics and frame rate control for applications 206 to present on-screen content 207 smoothly, at the fastest possible cadence, and may be implemented on a variety of hardware configurations. In some implementations, an API may provide a callback interface for the non-virtualized frequency 222 such as CompositorClock:: WaitforVblank and a callback interface for the virtualized frequency 224 such as the CompositorClock::WaitforVirtualVblank. In another implementation, such as a raster scan, the clock 226 implements an API such as IDXGIOutput:: WaitForVBlank, where a thread is halted until the next vblank occurs. In this example, the vblank occurs when the raster moves from the lower right corner to the upper left corner to begin drawing a next frame.

Figure 3:
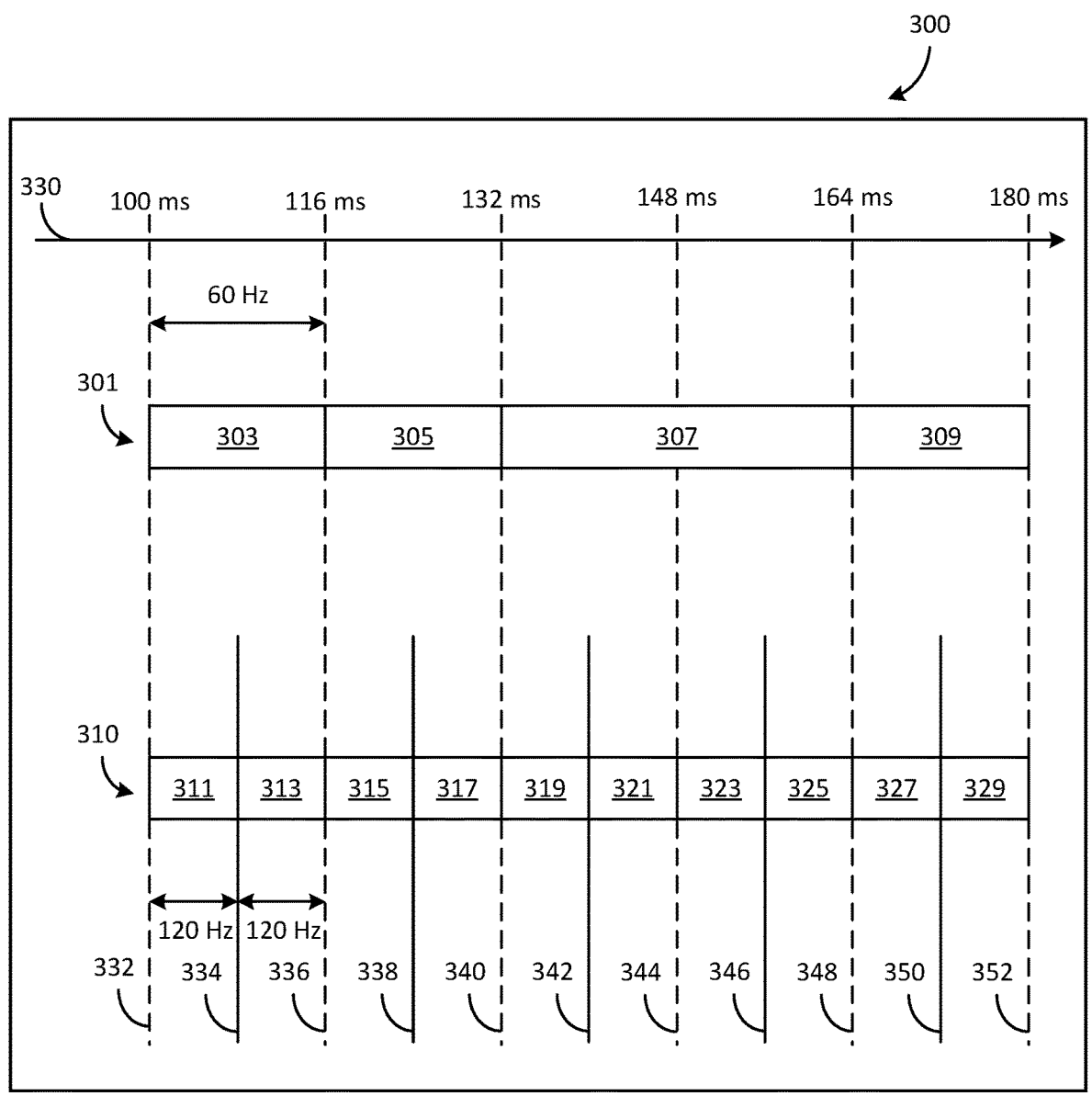
FIG. 3 is a timeline diagram illustrating a timeline for dynamic refresh rate switching according to various examples of the present disclosure.

In some implementations, the processor 208 maintains frame statistics for both previous frames and the next expected frame. The frame statistics may include a last frame time, a current composition rate, a current time, a time frequency, and a next estimated frame time. For example, as illustrated in FIG. 3 below, a frame 313 includes a previous frame, the first frame 311, and a next frame, the third frame 315. The processor 208 may utilize the frame statistics to return an estimated time, composition rate, and virtual synchronization count for the following frame. In some implementations, the frame statistics are mapped to the clock 226 to track the time for a previous frame or next frame. In other implementations, the frame statistics are mapped to a vblank, such as a virtual vblank or a non-virtual vblank as described in greater detail below. The frame statistics may be accessed by an application 206 by requesting the frame statistics through an API and, upon receipt of the frame statistics, retrieving a particular frame or range of frame statistics. In some implementations, the frame statistics provided in response to the request includes both refresh counts for the non-virtualized frequency 222 and the virtualized frequency 224 for the application 206 to observe both the actual and the virtual frame rates.

Using a combination of the clock 226, the frame statistics, and requests to temporarily boost the refresh rate of the user interface 216, each application 206 may request changes to the boosting status of the user interface 216, wake at the correct time to receive the correct vblank cadence, and observe statistics to predict the next frame timing and understand where previous frames landed. Accordingly, applications 206 are provided the tools needed to manage boosting. However, some particular applications 206 may encounter challenges integrating each of these tools because of how the particular application 206 separates the input and user interface threads. For example, applications 206 may want to boost or change their clock 226 after receiving an input, which will manage behaviors that are typically executed by a user interface API.

In some implementations, the system 200 includes a queue 228. In some implementations, the queue 228 is stored on the memory 202. In other implementations, the queue 228 is stored on the data storage device 212. The queue 228 stores boosting requests received from one or more applications 206. For example, a request is logged and opened in the queue 228 upon receipt of a boost request from an application 206 and closed when a request to terminate, or cease, the temporary boost is received from the application 206. Accordingly, the queue 228 may contain one or more open requests at a time. The queue 228 may be scanned by the processor 208 to determine whether to grant requests to temporarily boost the refresh rate or to grant requests to cease the temporary boost to the refresh rate.

FIG. 3 is a timeline diagram illustrating a timeline for dynamic refresh rate switching according to various examples of the present disclosure. The timeline diagram 300 includes a first application 301 and a second application 310. As shown in the timeline diagram 300, each of the first application 301 and the second application 310 may be versions of the application 206 and executing on the user interface 216. For example, the first application 301 may be the first application 206a and the second application 310 may be the second application 206b.

As shown in the timeline diagram 300, the first application 301 is an application which has not opted in to the boosted refresh rate. For example, the first application 301 may see minimal or no improvement when refreshed at a higher refresh rate. For example, the first application 301 may include, but is not limited to, an application not presently receiving a user input or an application that does not support refreshing at an increased frame rate. In contrast, the second application 310 is an application that is opted in to boosted refresh rates, such as a paint or drawing application that responds to a user's direct input on the user interface 216. However, these examples are provided for illustration only and should not be construed as limiting. Various examples may be provided without departing from the scope of the present disclosure.

The timeline diagram 300 further includes a timeline 330 that includes intervals every 16 milliseconds (ms). For example, the timeline 330 includes intervals at 100 ms, 116 ms, 132 ms, 148 ms, 164 ms, and 180 ms. As shown in the timeline diagram 300, each interval of 16 ms is equivalent to a frequency of 60 Hz. In other words, a vblank sent at a frequency of 60 Hz will be delivered every 16 ms. The 60 Hz frequency may represent the virtualized frequency 222. As shown in the timeline diagram 300, two cycles of 120 Hz are equivalent to the 60 Hz. In other words, 120 Hz is a frequency with a rate twice as fast as 60 Hz. The 120 Hz frequency may represent the non-virtualized frequency 224. Each vblank represents the timing that a frame starts, refreshing the content 207 the particular application 206 presents on the user interface 216.

As illustrated in FIG. 3, the first application 301 has not opted in to the boosted frame rate and therefore operates on the virtualized frequency 222 of 60 Hz. For example, the first application 301 may be an application that does not support operations at a refresh rate higher than the virtualized frequency 222, an application that does not support operations at a refresh rate up to the non-virtualized frequency 224, or an application that derives minimal or no benefit from operating at the non-virtualized frequency 224. In contrast, the second application 310 has opted in to the boosted refresh rate and therefore operates on the non-virtualized frequency 224 of 120 Hz.

At each interval, the frame of the respective application refreshes, flips, or updates. For example, the first application 301 includes a first frame 303, a second frame 305, a third frame 307, and a fourth frame 309. The second application 310 includes a first frame 311, a second frame 313, a third frame 315, a fourth frame 317, a fifth frame 319, a sixth frame 321, a seventh frame 323, an eighth frame 325, a ninth frame 327, and a tenth frame 329.

At time=100 ms, a first set of pulses, or signals or vblanks, 332 are sent to each of the first application 301 and the second application 310. The first set of vblanks 332 may include a virtualized vblank sent to the first application 301 and a non-virtualized vblank sent to the second application 310. Upon receipt of the first set of vblanks, each of the first application 301 and the second application 310 refresh the content 207 displayed on the user interface 216 by updating to the next respective frame. For example, the first application 301 updates to a first frame 303 and the second application 310 updates to a first frame 311. Although described herein as first frames 303 and 311, it should be understood that the term first is used for reference only and the first frames 303 and 311 may be preceded in the timeline, before time=100 ms, by other frames.

As shown in the timeline diagram 300, following time=100 ms, the next non-virtualized vblank is delivered to the second application 310 that has opted in to the temporarily boosted refresh rate. For example, a second vblank 334 is sent to the second application 310 at a frequency of 120 Hz. It should be understood that because the frequency of 60 Hz is equivalent to a time of 16 ms, and the frequency of 120 Hz is twice as fast as the frequency of 60 Hz, the frequency of 120 Hz is equivalent to a time of 8 ms. In other words, the virtualized frequency 222 of 60 Hz sends a vblank every 16 ms and the non-virtualized frequency 224 of 120 Hz sends a vblank every 8 ms. Accordingly, at time=108 ms, the second non-virtualized vblank 334 is sent to the second application 310 that has opted in to the temporarily boosted refresh rate, and the second application 310 refreshes the content 207 displayed on the user interface 216 and updates to the second frame 313.

Due to the temporary boosting of the refresh rate of the user interface 216, the user interface 216 is boosted to the non-virtualized frequency 224 of 120 Hz, but the first application 301, which is not opted in to the boosted refresh rate, continues to operate at the baseline refresh rate of 60 Hz by waking every 16 ms and receiving only virtualized vblanks. In other words, although the OS for the system 200 operates at 120 Hz, the first application 301 wakes and receives only vblanks corresponding to the baseline refresh rate of 60 Hz. This provides power savings, because additional processing power is not used to refresh the frames of the first application 301 at the higher refresh rate, while providing a higher refresh rate, and therefore improved user experience, for applications such as the second application 310 which do see an improvement when refreshed at the higher refresh rate.

At time=116 ms, both the virtualized frequency 222 and the non-virtualized frequency 224 are scheduled to deliver a vblank, and a third set of vblanks 336 are sent to each of the first application 301 and the second application 310. Upon receipt, the first application 301 refreshes the content 207 displayed on the user interface 216 and updates to the second frame 305, and the second application 310 refreshes the content 207 displayed on the user interface 216 and updates to the third frame 315.

The sequence continues for the duration the first application 301 and the second application 310 are presented on the user interface 216. For example, a fourth vblank 338 is sent to the second application 310 at time=124 ms, a fifth vblank 340 is sent to the first application 301 and the second application 310 at time=132 ms, a sixth vblank 342 is sent to the second application 310 at time=140 ms, a seventh vblank 344 is sent to the first application 301 and the second application 310 at time=148 ms, an eighth vblank 346 is sent to the second application 310 at time=156 ms, a ninth vblank 348 is sent to the first application 301 and the second application 310 at time=164 ms, a tenth vblank 350 is sent to the second application 310 at time=172 ms, and an eleventh vblank 352 is sent to the first application 301 and the second application 310 at time=180 ms.

As shown in implementation of the timeline diagram 300, where the seventh vblank 344 is sent to the first application 301 and the second application 310 at time=148 ms, the second application 310 refreshes the contest presented on the user interface 216 from the sixth frame 321 to the seventh frame 323, but the first application 301 does not update the content 207 of the third frame 307. Accordingly, the third frame 307 continues until the ninth vblank 348 is sent at time=164 ms. This is because the content 207 presented on the user interface 216 at the third frame 307 of the first application 301 does not update or change with the reception of the seventh vblank 344.

The different vblanks are provided to each application 301, 310 based on a location of each particular application within the VSync framework 220. For example, each application that has opted in to the boosted refresh rate receives vblanks according to the non-virtualized frequency 222 and each application that has not opted in to the boosted refresh rate receives vblanks according to the virtualized frequency 224. Accordingly, in some implementations the first application 301 may represent each application operating, at the particular time=100 ms, on the virtualized frequency 224 and the second application 310 may represent each application operating, at the particular time=100 ms, on the non-virtualized frequency 222.

Accordingly, as shown in the timeline diagram 300, enabling multiple applications 206 to concurrently execute on a single user interface 216 at different refresh rates reduces power consumption, because resources are not allocated to shifting the refresh rates for different applications 206. For example, rather than expending resources to shift the refresh rate for specific applications, each executing application 206 receives a vblank at either the virtualized frequency 224 or non-virtualized frequency 222, depending on whether the application 206 is opted in to temporarily boosting the refresh rate. Further, applications 206 executing at the virtualized frequency 224 are able to execute at an appropriate refresh rate, rather than an accelerated refresh rate they are unable to take advantage of and would cause the expenditure of additional resources due to waking up to receive a new vblank twice as often as when executing at the baseline refresh rate.

It should be understood that the distinction between the non-virtualized frequency 224 and the virtualized frequency 224 is introduced upon the determination to temporarily boost the refresh rate of the operating system. Until the processor 208 receives a request or requests to temporarily boost the refresh rate, each of the applications 206 presented on the user interface 216 refresh at the baseline refresh rate. For example, each of the applications 206 may be presented on the user interface 216 and refresh at the baseline refresh rate of 60 Hz. Upon receiving one or more requests to boost the refresh rate, the processor 208 calls the Vsync framework 220. The scheduler 218 determines which applications 206 have opted in to the non-virtualized frequency 222 and which applications 206 have not opted in and therefore will continue to refresh at the baseline refresh rate via the virtualized frequency 224. Based on the determination to boost the refresh rate and the determination of which applications have opted in to the non-virtualized frequency 222 and which applications have not opted in, the scheduler 218 then temporarily boosts the refresh rate as described herein.

As shown in the timeline diagram 300, the boosted refresh rate of 120 Hz provides the next vblank in 8 ms, rather than 16 ms for the baseline frame rate of 60 Hz. While this reduces latency and improves performance, the boosted refresh rate may sometimes introduce a glitch because the processor 208 has half the usual amount of time to render the next frame. Accordingly, the processor 208 may select to enter a parallel mode when failing to render, or compose, a frame within the time required to do so. Parallel mode refers to a mode of operation where a frame compositor begins rendering for a frame two-vblanks ahead in time, rather than rendering for a frame one-vblank in time. In parallel mode, the processor 208 trades off an additional frame of latency in exchange for additional time to render a frame. Thus, the frame compositor has twice the amount of time to render the frame than it otherwise would, which reduces latency and improves performance of the user interface 216. However, due to the extra time required to render each frame, each frame will be presented one frame later than scheduled.

In some implementations, the processor 208 may select to enter parallel mode for the duration of the temporary boosting of the refresh rate. For example, the processor 208 may automatically enter parallel model every time temporary boosting occurs. The result is higher latency for all composed frames, whether presented in the non-virtualized frequency 222 or the virtualized frequency 224, but still a smoother experience than a refresh rate of 60 Hz for applications 206 executing on the non-virtualized frequency 222.

Figure 4:
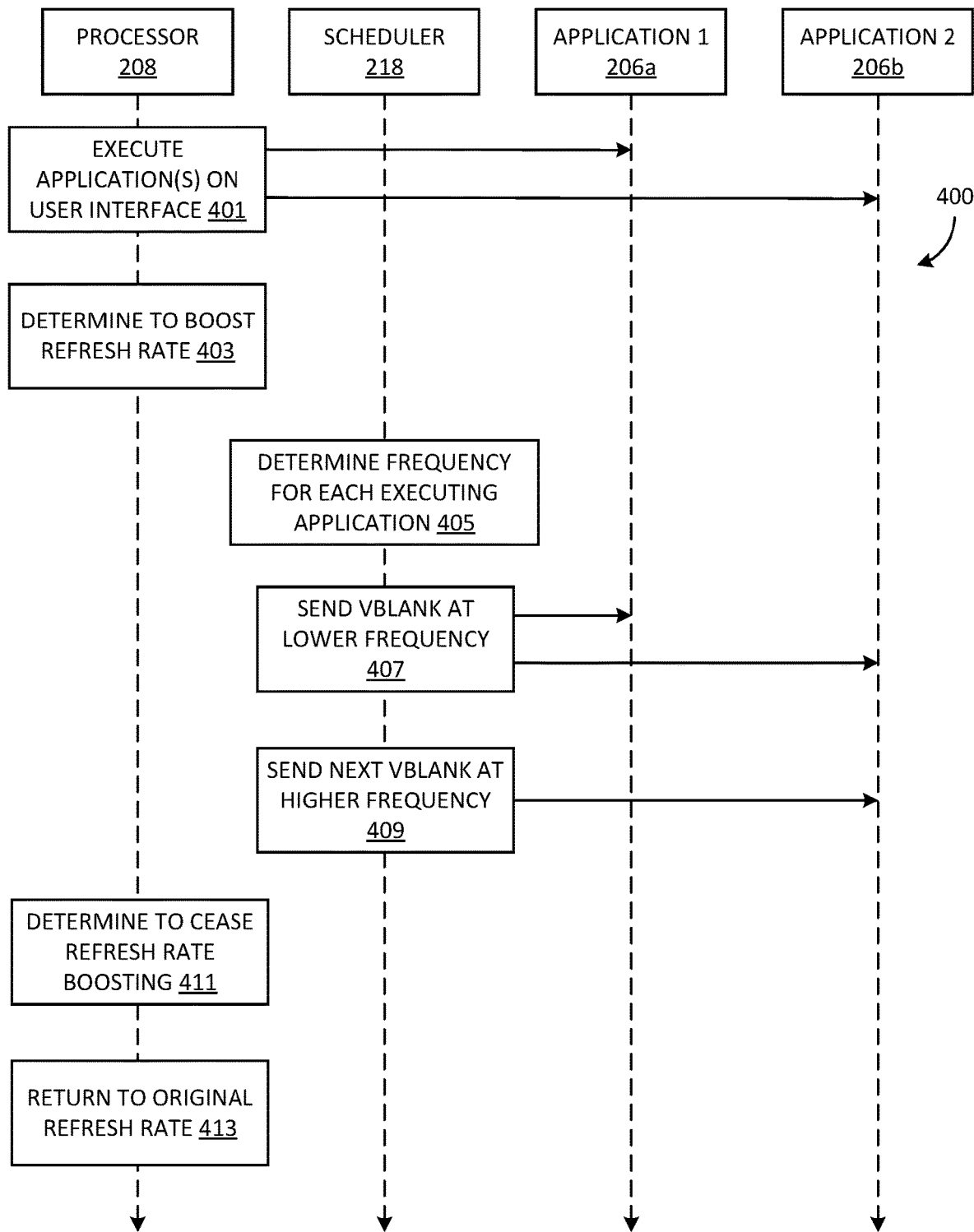
FIG. 4 is a flow chart illustrating a computer-implemented method for an example of dynamic refresh rate switching according to various examples of the present disclosure.

FIG. 4 is a flow chart illustrating a computer-implemented method for an example of dynamic refresh rate switching according to various examples of the present disclosure. The operations illustrated in FIG. 4 are for illustration and should not be construed as limiting. Various examples of the operations may be used without departing from the scope of the present disclosure. The operations of the flow chart 400 may be executed by one or more components of the system 200, including the processor 208, the scheduler 218, the first application 206a, and the second application 206b.

The flow chart 400 begins by the processor 208 executing one or more applications 206 on the user interface 216 in operation 401. For example, as shown in the flow chart 400, the first application 206a and the second application 206b are each presented on the user interface 216. However, it should be understood that more or fewer than two applications 206 may be presented on the user interface 216. As described herein, the user interface 216 may include one or more displays, such as monitors, upon which the one or more applications 206 are presented, or displayed.

In operation 403, the processor 208 determines to temporarily boost the refresh rate of the user interface 216. The processor 208 may make the determination based on the reception of a request from an API of the one or more applications presented on the user interface 216. For example, where one of the applications 206 receives an input directly on the user interface 216, the application may send a request to the processor 208 to temporarily boost the refresh rate of the user interface 216. The application 206 may call the processor 208 through either a public API or a private API to request a temporary boost.

In some implementations, the processor 208 determines to temporarily boost the refresh rate of the user interface 216 based on the reception of one request to boost the refresh rate. In other implementations, the processor 208 aggregates the requests and determines to temporarily boost the refresh rate of the user interface 216 based on the reception of a threshold number of requests from applications 206 and APIs received and stored in the queue 228. The threshold may be set by the processor 208 to ensure that a sufficient quantity of applications 206 would be advantaged by temporarily boosting the refresh rate of the user interface 216. Based on the determination to boost the refresh rate of the user interface 216, the processor 208 calls the scheduler 218 to execute the temporary boost.

In operation 405, the scheduler 218 determines the frequency for each executing application 206. In some implementations, determining the frequency includes identifying each executing application 206 within the VSync framework 220 as either opted in to the non-virtualized frequency 222 or not opted in to the non-virtualized frequency 222 and therefore operating under the virtualized frequency 224.

Following the determination of whether each executing application 206 is opted in to the non-virtualized frequency 222 or not opted in to the non-virtualized frequency 222, the scheduler 218 initiates the temporary boosting of the refresh rate of the user interface 216. For example, in operation 407 the scheduler 218 sends a vblank, at an interval corresponding to the lower frequency, to applications executing at both the non-virtualized frequency 222 and the virtualized frequency 224, and then in operation 409 the scheduler 218 sends a vblank at an interval corresponding to the higher frequency to applications executing at only the non-virtualized frequency 222. For example, as described with reference to FIG. 3, at a first time such as 100 ms, a vblank 332 is sent to applications 206 executing at the non-virtualized frequency 222 and at the virtualized frequency 224; at a second time such as 108 ms, a vblank 334 is sent to applications 206 executing at the non-virtualized frequency 222 only; and at a third time such as 106 ms, a vblank 336 is sent to applications 206 executing at both the non-virtualized frequency 222 and the virtualized frequency 224, and so forth. Operations 407 and 409 may repeat until the conclusion of the temporary boosting period.

In operation 411, the processor 208 determines to cease temporary boosting the refresh rate of the user interface 216. In some implementations, the processor 208 determines to cease the temporary boosting based on a predetermined period of time expiring. For example, the original determination to temporarily boost the refresh rate in operation 403 may be a determination to boost the refresh rate for a period of time and upon the expiration of the period of time, the processor 208 determines to cease the refresh rate boosting. In another implementation, the processor 208 determines to cease the temporary boosting based on the reception of a request to cease the temporary boosting from one or more of the applications 206 executing at the non-virtualized frequency 222. In yet another implementation, the processor 208 determines to cease the temporary boosting based on all other boosting requests having been canceled and the processes of those applications 206 remaining active. In other words, the processor 208 will accept the request to cease the temporary boosting if and only if no other boosting requests are open.

In operation 413, the processor 208 controls the user interface 216 to return to the original refresh rate and ceases the temporary boosting of the refresh rate. In other words, each of the applications 206 presented on the user interface 216 return to refreshing, or updating, on the baseline frequency. Following operation 413, each application 206 presented on the user interface 216 receives the next vblank at the lower, baseline frequency, which is the same as the virtualized frequency 224.

Figure 5A:
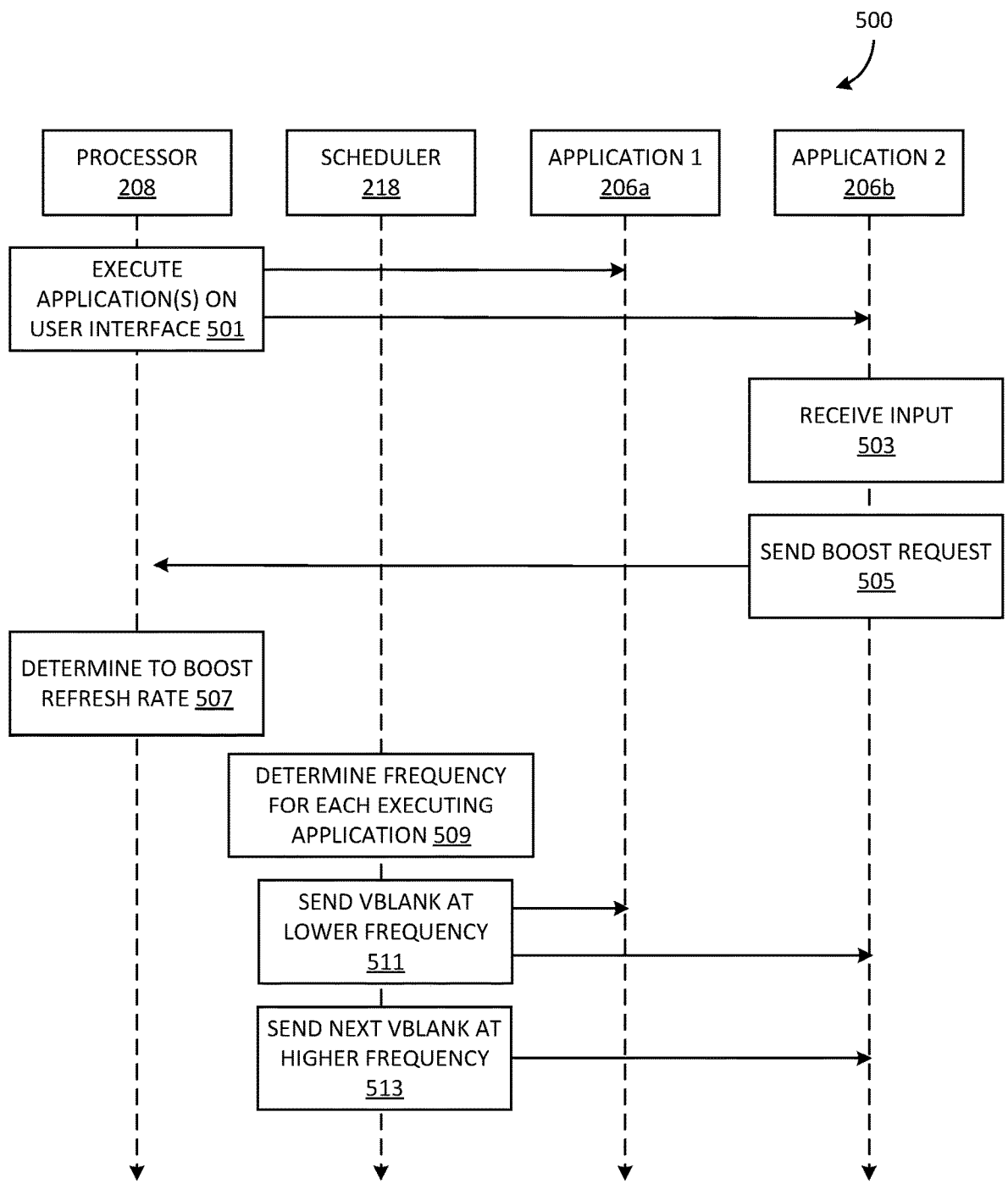
FIGS. 5A and 5B are a flow chart illustrating a computer-implemented method for another example of dynamic refresh rate switching according to various examples of the present disclosure.
Figure 5B:
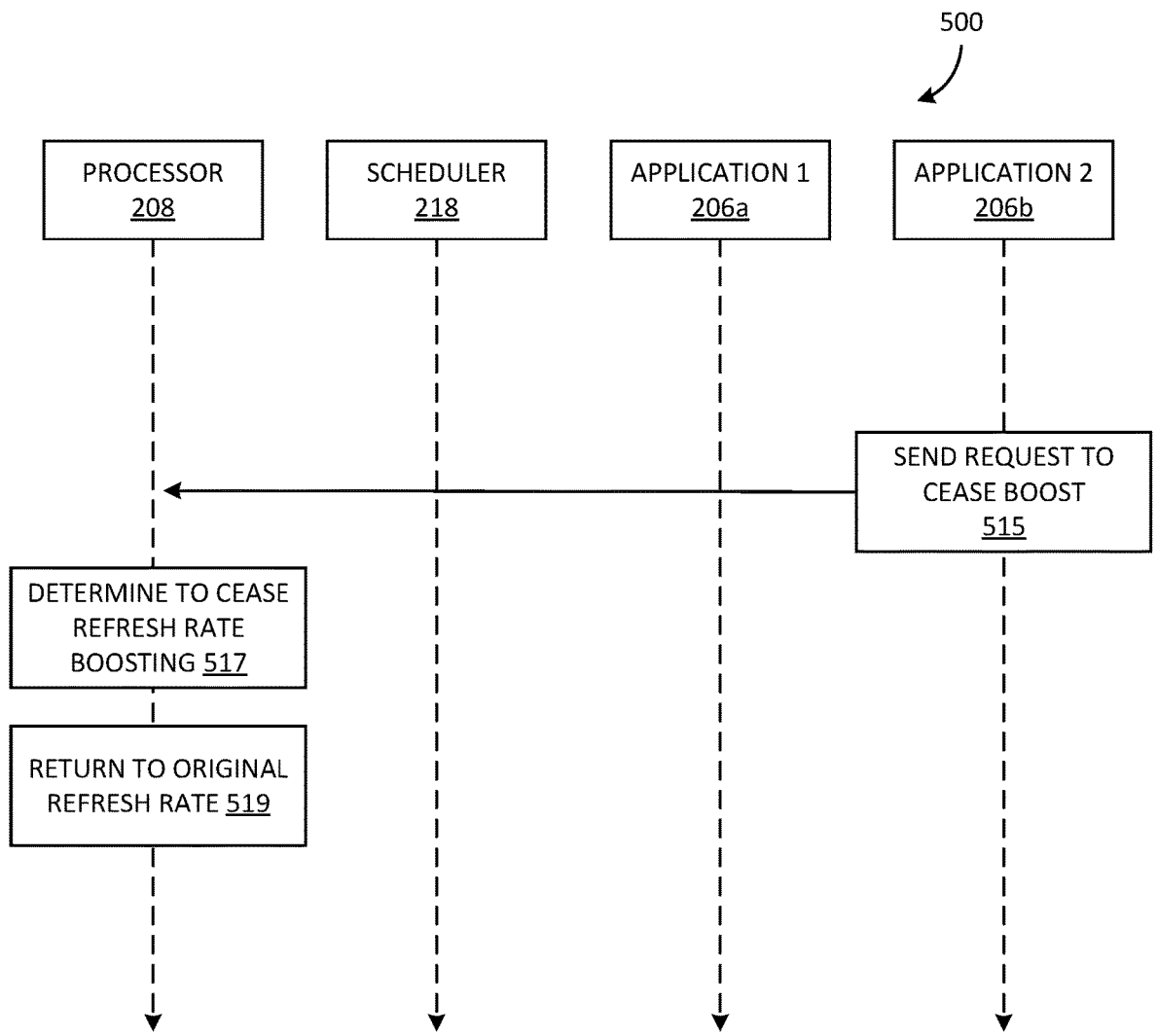

FIGS. 5A and 5B are a flow chart illustrating a computer-implemented method for another example of dynamic refresh rate switching according to various examples of the present disclosure. The operations illustrated in FIGS. 5A and 5B are for illustration and should not be construed as limiting. Various examples of the operations may be used without departing from the scope of the present disclosure. The operations of the flow chart 500 may be executed by one or more components of the system 200, including the processor 208, the scheduler 218, the first application 206a, and the second application 206b. It should be understood that FIG. 5B is a continuation of FIG. 5A and that collectively, FIGS. 5A and 5B illustrate the flow chart 500. In some examples, the flow chart 500 is one particular implementation of the flow chart 400.

The flow chart 500 begins by the processor 208 executing one or more applications 206 on the user interface 216 in operation 501. For example, as shown in the flow chart 500, the first application 206a and the second application 206b are each presented on the user interface 216. However, it should be understood that more or fewer than two applications 206 may be presented on the user interface 216. As described herein, the user interface 216 may include one or more displays, such as monitors, upon which the one or more applications 206 are presented, or displayed.

In operation 503, the second applications 206b receives an input. For example, the second application 206b may be a drawing or inking application that receives an input from a stylus or a finger of a user of the system 200. In another example, the second application 206b may receive an input such as scrolling or panning within the second application 206b. In operation 505, responsive to receiving the input, the second application 206b sends a request, to the processor 208, to temporarily boost the refresh rate of the user interface 216. For example, due to receiving the input, the second application 206b may recognize the potential advantages of refreshing at a higher rate at the particular time. In operation 507, the processor 208 determines to boost the refresh rate for the user interface 216, based on receiving the request to temporarily boost the refresh rate from the second application 206b, and calls the scheduler 218 to execute the temporary boost.

In operation 509, the scheduler 218 determines the frequency for each executing application 206. In some implementations, determining the frequency includes identifying each executing application 206 within the VSync framework 220 as either opted in to the non-virtualized frequency 222 or not opted in to the non-virtualized frequency 222 and therefore operating under the virtualized frequency 224. For example, the second application 206b is reassigned to the non-virtualized frequency 222 responsive to the request to temporarily boost the refresh rate.

Following the determination of whether each executing application 206 is opted in to the non-virtualized frequency 222 or not opted in to the non-virtualized frequency 222, the scheduler 218 initiates the temporary boosting of the refresh rate of the user interface 216. For example, in operation 511 the scheduler 218 sends a vblank, at an interval corresponding to the lower frequency, to applications executing at both the non-virtualized frequency 222 and the virtualized frequency 224, and then in operation 513 the scheduler 218 sends a vblank at an interval corresponding to the higher frequency to applications executing at only the non-virtualized frequency 222. For example, as described in the description of FIGS. 3 and 4, at a first time such as 100 ms, a vblank 332 is sent to applications 206 executing at the non-virtualized frequency 222 and at the virtualized frequency 224, at a second time such as 108 ms, a vblank 334 is sent to applications 206 executing at the non-virtualized frequency 222 only, and at a third time such as 106 ms, a vblank 336 is sent to applications 206 executing at both the non-virtualized frequency 222 and the virtualized frequency 224, and so forth. Operations 507 and 509 may repeat until the conclusion of the temporary boosting period.

In operation 515, the second application 206b sends a request to the processor 208 to cease the temporary boosting of the refresh rate, or unboost. The second applications 206b may send the request to unboost for one of several different reasons. In one implementation, the second application 206b determines to unboost based on not receiving additional input for a predetermined amount of time. For example, where a predetermined amount of time passes without the second application 206b receiving an input, the second application 206b automatically sends a request to the processor 208 to unboost. In other implementations, the initial request to boost may be intended as a request to boost for a particular period of time, and upon the expiration of the particular period of time, the second application 206b automatically sends a request to the processor 208 to unboost. In still other implementations, the second application 206b opts to return to the baseline refresh rate to lessen the impact on the system 200. For example, one or more applications 206 may include functionality to determine when requests to temporarily boost the refresh rate are sent and/or rescinded. For example, an application 206 may include functionality to send and/or rescind a request to temporarily boost the refresh rate when the application 206 determines to do so would provide a visual benefit on the user interface 216, such as scrolling, panning, or receiving an input, or when there is a power pertinent reason for holding back the refresh rate to an unboosted rate.

In operation 517, the processor 208 determines to cease the temporary boosting of the refresh rate of the user interface 216 based on the reception of a request to cease the temporary boosting from one or more of the applications 206 executing at the non-virtualized frequency 222. In some implementations, the processor 208 determines to cease the temporary boosting based on all other boosting requests having been canceled and the processes of those applications 206 remaining active, and the request transmitted from the second application 206b being the final request to cease the temporary boosting. In other words, the processor 208 determines to cease the temporary boosting if and only if no other boosting requests are open.

In operation 519, the processor 208 controls the user interface 216 to return to the original refresh rate and ceases the temporary boosting of the refresh rate. In other words, each of the applications 206 presented on the user interface 216 return to refreshing, or updating, on the baseline frequency. Following operation 413, each application 206 presented on the user interface 216 receives the next vblank at the lower, baseline frequency, which is the same as the virtualized frequency 224.

It should be understood that as shown in FIGS. 5A and 5B, the second application 206b receives an input, sends the boost request, and sends the unboost request. However, these examples are provided for illustration only and should not be construed as limiting. Various examples are possible without departing from the scope of the present disclosure. For example, the first application 206a may also be an example of an application that receives an input, based on the reception of the input, sends a boost request to the processor 208, and ultimately sends an unboost request to the processor 208. In another implementation, each of the first and second applications 206a, 206b receive inputs and send boost requests. For example, the second application 206b may receive an input and opt in to the temporary boost. In the midst of the duration of the temporary boosting in operations 511 and 513, the first application 206a receives an input and sends a request to temporarily boost the refresh rate. The scheduler 218 detects a change in the status of the first application 206a, as the first application 206a has now opted in to temporarily boosting the refresh rate, upon the first application 206a sending the request to temporarily boost the refresh rate and updates the VSync framework 220 to include the first application 206a as executing on the non-virtualized frequency 222. The scheduler 218 then sends the non-virtualized vblanks to each of the first application 206a and the second application 206b throughout the period of temporary boosting. Furthermore, the processor 208 may not determine to cease the refresh rate boosting in operation 517 until a request to cease the temporary boosting is received from each of the first application 206a and the second application 206b.

FIG. 6 illustrates an example system including applications displayed on more than one display according to various examples of the present disclosure. The system 600 includes a first display 601 and a second display 603. As shown in the system 600, the first display 601 and a second display 603 may collectively be referred to as the user interface 216.

As described herein, each of the first display 601 and the second display 603 may be a monitor, a laptop display, a touch screen, or any other suitable display device to present content 207. One or both of the first display 601 and the second display 603 may be an in plane switching (IPS) liquid-crystal display (LCD), an LCD without IPS, an organic light-emitting diode (OLED) screen, or any other suitable type of display. In some implementations, one or both of the first display 601 and the second display 603 may include a touch screen such that the respective display may directly receive an input, such as from a stylus or from the finger of a user of the system 200. One or both of the first display 601 and the second display 603 may support various interactions, such as panning, scrolling, zooming in, zooming out, inking, and so forth.

As shown in FIG. 6, the first display 601 presents one or more applications, such as the first application 206a, and the second display 603 presents one or more applications, such as the second application 206b and the third application 206n. However, these examples should not be construed as limiting. Various examples are possible. The system 600 may include more or fewer than two displays to display content 207. In some implementations, the first display 601 displays content 207 corresponding to more than one application or zero applications. In some implementations, the second display 603 displays content 207 corresponding to less than two applications, no applications, or more than two applications. Each of the respective displays 601, 603 may display content 207 in various display formats. For example, one application 206 may be presented in a full-screen mode, where the entire display displays content 207 corresponding to the one application 206, two or more applications 206 may be presented in a split-screen mode, where each application 206 is presented on less than the entire display but the entire display displays content 207 corresponding to the applications 206, or a partial-screen mode, where at least one application is presented on the display but on less than the entire display such that other applications may be at least partially viewed and interacted with.

In some implementations, one of the first display 601 and the second display 603 is characterized as the primary display. The primary display may be characterized as such either by a user selection or automatically selected by the processor 208. For example, the processor 208 may characterize the primary display as the display having a higher maximum refresh rate, the display having a larger size, or any other suitable methods. The primary display may be automatically characterized, or identified, by the processor 208 each time a new display is connected, each time a new display is removed, each time the system 200 is turned on, each time the system 200 is connected to the network, or at a predetermined interval. The primary display may also be characterized, or identified, by a user selection at any time to override the automatic selection by the processor 208.

Each of the first display 601 and the second display 603 are configured with manufacturer settings that control a maximum refresh rate supported by the respective display. For example, each of the first display 601 and the second display 603 may have a maximum refresh rate of 60 Hz, 120 Hz, or any other suitable refresh rate. In some implementations, the first display 601 and the second display 603 have the same maximum refresh rate. For example, each of the first display 601 and the second display 603 may have a maximum refresh rate of 60 Hz or 120 Hz. In other implementations, the first display 601 and the second display 603 have different maximum refresh rates. For example, the first display 601 may have a maximum refresh rate of 60 Hz while the second display 603 may have a maximum refresh rate of 120 Hz.

As described herein, the availability of dynamic refresh rate temporary boosting depends on the compatibility of components of the particular system 200 executing the one or more applications, such as instructions 204 and the user interface 216 displaying the content 207 of the particular application at the time. For example, as shown in FIG. 6, the first display 601 displays content 207 of the first application 206a. For the processor 208 to temporarily boost the refresh rate of the first application 206a, the first application 206a must be opted in to dynamic refresh rate switching, i.e., must have opted in to operate under the non-virtualized frequency 222, and the first display 601 must support the boosted refresh rate. The opting in to the dynamic refresh rate switching may be implicit, such as by construction of the application 206, or explicit, such as by the sending of signal indicating the status of the application 206 as opted in. In some implementations, dynamic refresh rate temporary boosting is not available for any displays of the user interface 216 if the display characterized as the primary display does not support the boosted refresh rate.

In one implementation, the first display 601 does not support the boosted refresh rate, while the second display 603 does support the boosted refresh rate. The second display 603 displaying the second application 206b and the third application 206n is characterized as the primary display. The first display 601 displaying the first application 206a is thus characterized as a secondary, i.e., non-primary, display. Because the first display 601 does not support the boosted refresh rate, the first application 206a renders each frame at the rate of the primary display, i.e., the second display 603, but the rendered frames are presented on the first display 601 at the maximum refresh rate of the first display 601, for example the unboosted refresh rate. The second application 206b is opted in to temporary boosting, but the third application 206n is not opted in to temporary boosting. The second application 206b transmits a boosting request to the processor 208, for example based on receiving an input on the second display 603, such as a touch input, scrolling, panning, zooming in, zooming out, or inking. As described herein, the processor 208 receives the request to temporarily boost the refresh rate, determines to temporarily boost the refresh rate, and controls the scheduler 218 to determine the opted frequency for each executing application on displays that support the boosted refresh rate. Based on the aforementioned opting preferences of the second application 206b and the third application 206n, the scheduler 218 identifies the second application 206b as executing on the non-virtualized frequency 222 and the third application 206n as executing on the virtualized frequency 224. Therefore, the second application 206b receives clock notifications at the non-virtualized frequency 222 and the third application 206n receives clock notifications at the virtualized frequency 224 as described in greater detail with reference to the description of FIG. 3. Accordingly, the refresh rate of the second display 603 is temporarily boosted to the higher refresh rate, enabling the second application 206b to refresh at a higher rate for the duration of the temporary boosting and enabling the third application 206n to continue refreshing at a virtual rate consistent with its capability.

At a later time, the second application 206b transmits a request to cease, or terminate, the temporary boosting of the refresh rate. For example, the second application 206b may no longer be actively receiving the input that prompted the request to temporarily boost the refresh rate. Upon receiving the request, the processor 208 determines whether to cease the temporary boosting. For example, the processor 208 may scan the queue 228 of boosting requests to determine whether any boosting requests remain open, i.e., have not been terminated or closed. Where no open boost requests are identified in the queue 228, the processor 208 terminates the temporary boosting and the second application 206b returns to executing at the original refresh rate. Where other boost requests are identified in the queue 228, the processor 208 cancels the boost request of the second application 206b but does not terminate the temporary boost of the user interface 216. In this example, the second application 206b may be transferred within the V Sync framework 220 to the virtualized frequency 224 and continue refreshing at the original refresh rate.

Figure 7:
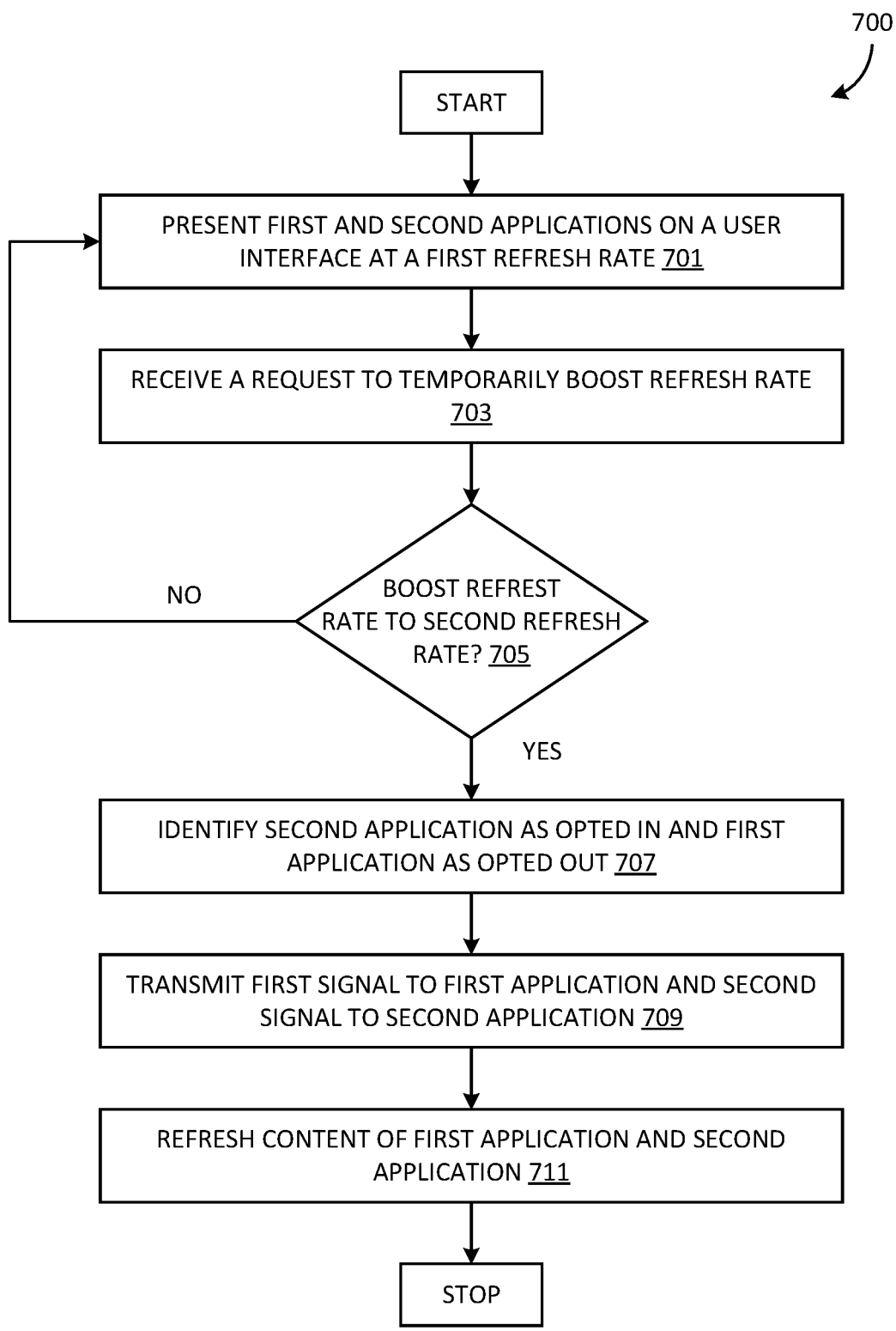
FIG. 7 is a flow chart illustrating a computer-implemented method of dynamic refresh rate switching according to various examples of the present disclosure.

FIG. 7 is a flow chart illustrating a computer-implemented method of dynamic refresh rate switching according to various examples of the present disclosure. The operations illustrated in FIG. 7 are for illustration and should not be construed as limiting. Various examples of the operations may be used without departing from the scope of the present disclosure. The operations of the flow chart 700 may be executed by one or more components of the system 200, including the processor 208, the scheduler 218, the first application 206a, and the second application 206b.

The flow chart 700 begins by the processor 208 presenting a first application 206a and a second application 206b on a user interface 216 in operation 701. The first application 206a and a second application 206b initially execute at a first refresh rate. In operation 703, the processor 208 receives, from the second application 206b, a request to temporarily boost the first refresh rate to a second refresh rate. The second refresh rate is higher than the first refresh rate.

In operation 705, the processor 208 determines whether to temporarily boost the refresh rate to the second refresh rate. In some implementations, the processor 208 determines to temporarily boost the refresh rate to the second refresh rate based on the receipt of a first request to boost from an application. In other implementations, the processor 208 scans the queue 228 for open boost requests and temporarily boosts the refresh rate only when a predetermined number of requests to boost have been received. Where the processor 208 determines not to boost the refresh rate, the processor 208 returns to operation 701 and continues to present the first application 206a and a second application 206b on the user interface 216 at the first refresh rate. Where the processor 208 determines to boost the refresh rate, the processor 208 proceeds to operation 707.

In operation 707, the processor 208 controls the scheduler 218 to identify the executing application 216 as opted in to executing at the boosted refresh rate or not opted in. For example, the scheduler 218 identifies the second application 206b as opted in to the second refresh rate and identifies the first application 206a as not opted in to the second refresh rate. In operation 709, the scheduler 218 transmits a first signal to the first application 206a to refresh first content 207a presented on the user interface 216 at the first refresh rate and transmits a second signal to the second application 206b to refresh second content 207b presented on the user interface 216 at the second refresh rate. The first signal is a virtualized pulse indicating a new frame corresponding to the first refresh rate and the second signal is a non-virtualized pulse indicating a new frame corresponding to the second refresh rate. In some implementations, the first signal and the second signal are the same signal, such as a vblank indicating to refresh the content presented on the user interface 216, but transmitted with different timing. In operation 711, the first application 206a refreshes the first content 207a upon receipt of the first signal and the second application 206b refreshes the second content 207b upon receipt of the second signal.

ADDITIONAL EXAMPLES

Some examples herein are directed to a method of dynamically updating a refresh rate, as illustrated by the flow chart 700. The method (700) includes presenting (701) a first application (206a) and a second application (206b) on at least one user interface (216), each of the first application and the second application executing at a first refresh rate; receiving (703), from the second application, a request to temporarily boost the first refresh rate to a second refresh rate, wherein the second refresh rate is higher than the first refresh rate; responsive to receiving the request, determining (705) to temporarily boost the first refresh rate to a second refresh rate; identifying (707), by a scheduler (218), the second application as opted in to the second refresh rate and identifying the first application as not opted in to the second refresh rate; transmitting (709), by the scheduler, a first signal (332) to the first application to refresh first content (207a) presented on the user interface at the first refresh rate and transmitting, by the scheduler, a second signal (334) to the second application to refresh second content (207b) presented on the user interface at the second refresh rate, wherein the first signal is a virtualized pulse indicating a new frame corresponding to the first refresh rate and wherein the second signal is a non-virtualized pulse indicating a new frame corresponding to the second refresh rate; and controlling the first application to refresh (711) the first content at the first refresh rate upon receipt of the first signal and controlling the second application to refresh the second content at the second refresh rate upon receipt of the second signal.

In some examples, the method further includes receiving a request, from the second application, to terminate the temporary boost to the second refresh rate.

In some examples, the method further includes, responsive to receiving the request to terminate the temporary boost, scanning a queue (228) of boost requests to identify any open boost requests, and based on identifying no open boost requests, terminating the temporary boost such that the second application returns to executing at the first refresh rate.

In some examples, the method further comprises accessing a virtual framework (220), and identifying the second application as opted in to the second refresh rate and identifying the first application as not opted in to the second refresh rate by identifying the first application and the second application within the virtual framework.

In some examples, the method further comprises receiving, from the second application, a request to opt in to the second refresh rate, wherein opting in to the second refresh rate includes opting to receive clock (226) notifications at a higher frequency than the first refresh rate.

In some examples, a frequency of the second refresh rate is an integer multiple of the first refresh rate.

In some examples, receiving, from the second application, the request to temporarily boost the refresh rate includes receiving the request based at least in part on the second application receiving an input on the user interface.

In some examples, the received input comprises one or more of panning, scrolling, zooming in, zooming out, and inking.

Although described in connection with an example computing device 100 and system 200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, servers, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system for dynamically updating a refresh rate, the system comprising:
    at least one processor;
    a first application and a second application;
    at least one user interface configured to present the first application and the second application, each of the first application and the second application executing at a first refresh rate;
    at least one memory storing instructions that, when executed by the processor, causes the processor to:
        responsive to receiving a request from the second application to temporarily boost the first refresh rate, determine to temporarily boost the first refresh rate to a second refresh rate, wherein the second refresh rate is higher than the first refresh rate,
        control a scheduler, implemented on the at least one processor, to identify the second application as opted in to the second refresh rate and identify the first application as not opted in to the second refresh rate,
        control the scheduler to transmit a first signal to the first application to refresh first content presented on the user interface at the first refresh rate, wherein the first signal is transmitted in accordance with a virtualized refresh rate,
        control the scheduler to transmit a second signal to the second application to refresh second content presented on the user interface at the second refresh rate, wherein the second signal is transmitted in accordance with a non-virtualized refresh rate, and
        control the first application to refresh the first content at the first refresh rate upon receipt of the first signal and the second application to refresh the second content at the second refresh rate upon receipt of the second signal.

2. The system of claim 1, wherein the memory further stores instructions that, when executed by the processor, cause the processor to:
    receive a request, from the second application, to terminate the temporary boost to the second refresh rate.

3. The system of claim 2, wherein the memory further stores instructions that, when executed by the processor, cause the processor to:
    responsive to receiving the request to terminate the temporary boost, scan a queue of boost requests to identify any open boost requests, and based on identifying no open boost requests, terminate the temporary boost such that the second application returns to executing at the first refresh rate.

4. The system of claim 1, wherein:
the scheduler includes a virtual framework, and
the instructions further cause the processor to control the scheduler, to identify the second application as opted in to the second refresh rate and identify the first application as not opted in to the second refresh rate, to identify the first application and the second application within the virtual framework.

5. The system of claim 1, wherein the second application is configured to opt in to the second refresh rate by opting to receive clock notifications at a higher frequency than the first refresh rate.

6. The system of claim 1, wherein a frequency of the second refresh rate is an integer multiple of the first refresh rate.

7. The system of claim 1, wherein the second application is configured to send the request to temporarily boost the refresh rate based at least in part on receiving an input on the user interface.

8. The system of claim 7, wherein the received input comprises one or more of panning, scrolling, zooming in, zooming out, and inking.

9. The system of claim 1, wherein:
the first signal is a virtualized pulse indicating a new frame corresponding to the first refresh rate, and
the second signal is a non-virtualized pulse indicating a new frame corresponding to the second refresh rate.

10. The system of claim 1, wherein: the at least one user interface is presented on a first monitor that presents the first application and a second monitor that presents the second application.

11. A method for dynamically updating a refresh rate, the method comprising:
presenting a first application and a second application on at least one user interface, each of the first application and the second application executing at a first refresh rate;
receiving, from the second application, a request to temporarily boost the first refresh rate to a second refresh rate, wherein the second refresh rate is higher than the first refresh rate;
responsive to receiving the request, determining to temporarily boost the first refresh rate to a second refresh rate;
identifying, by a scheduler, the second application as opted in to the second refresh rate and identifying the first application as not opted in to the second refresh rate;
transmitting, by the scheduler, a first signal to the first application to refresh first content presented on the user interface at the first refresh rate, wherein the first signal is a virtualized pulse indicating a new frame corresponding to the first refresh rate;
transmitting, by the scheduler, a second signal to the second application to refresh second content presented on the user interface at the second refresh rate, wherein the second signal is a non-virtualized pulse indicating a new frame corresponding to the second refresh rate; and
controlling the first application to refresh the first content at the first refresh rate upon receipt of the first signal and controlling the second application to refresh the second content at the second refresh rate upon receipt of the second signal.

12. The method of claim 11, further comprising:
receiving a request, from the second application, to terminate the temporary boost to the second refresh rate.

13. The method of claim 12, further comprising:
responsive to receiving the request to terminate the temporary boost, scanning a queue of boost requests to identify any open boost requests, and
based on identifying no open boost requests, terminating the temporary boost such that the second application returns to executing at the first refresh rate.

14. The method of claim 11, further comprising:
accessing a virtual framework, and
identifying the second application as opted in to the second refresh rate and identifying the first application as not opted in to the second refresh rate by identifying the first application and the second application within the virtual framework.

15. The method of claim 11, further comprising:
receiving, from the second application, a request to opt in to the second refresh rate, wherein opting in to the second refresh rate includes opting to receive clock notifications at a higher frequency than the first refresh rate.

16. The method of claim 11, wherein a frequency of the second refresh rate is an integer multiple of the first refresh rate.

17. The method of claim 11, wherein:
receiving, from the second application, the request to temporarily boost the refresh rate includes receiving the request based at least in part on the second application receiving an input on the user interface.

18. The method of claim 17, wherein the received input comprises one or more of panning, scrolling, zooming in, zooming out, and inking.

19. One or more computer-storage memory devices embodied with executable instructions that, when executed by a processor, cause the processor to:
present a first application and a second application on at least one user interface, each of the first application and the second application executing at a first refresh rate;
based at least in part on receiving an input at the second application, receiving, from the second application, a request to temporarily boost the first refresh rate based at least in part on receiving the input, the input comprising one or more of one or more of panning, scrolling, zooming in, zooming out, and inking;
responsive to receiving the request, determine to temporarily boost the first refresh rate to a second refresh rate;
identify, by a scheduler implemented on the processor, the second application as opted in to the second refresh rate and identify the first application as not opted in to the second refresh rate;
transmit, by the scheduler, a first signal to the first application to refresh first content presented on the user interface at the first refresh rate, wherein the first signal is a virtualized pulse indicating a new frame corresponding to the first refresh rate;
transmit, by the scheduler, a second signal to the second application to refresh second content presented on the user interface at the second refresh rate, wherein the second signal is a non-virtualized pulse indicating a new frame corresponding to the second refresh rate; and
control the first application to refresh the first content at the first refresh rate upon receipt of the first signal and control the second application to refresh the second content at the second refresh rate upon receipt of the second signal.

20. The one or more computer-storage memory devices of claim 19, wherein the processor further:
   receives a request, from the second application, to terminate the temporary boost to the second refresh rate,
   responsive to receiving the request to terminate the temporary boost, scans a queue of boost requests to identify any open boost requests, and
   based on identifying no open boost requests, terminates the temporary boost such that the second application returns to executing at the first refresh rate.

* * * * *